US006415737B2

(12) United States Patent
Banyas et al.

(10) Patent No.: US 6,415,737 B2
(45) Date of Patent: Jul. 9, 2002

(54) COLLAPSIBLE PERCHES FOR BIRD FEEDERS AND BIRDHOUSES

(75) Inventors: Michael Banyas, Atlanta; Paul L. Artigues, Kennesaw, both of GA (US)

(73) Assignee: Health Sciences Corporation, Cumming, GA (US)

( * ) Notice: Subject to any disclaimer, the term of this patent is extended or adjusted under 35 U.S.C. 154(b) by 0 days.

(21) Appl. No.: 09/755,762

(22) Filed: Jan. 6, 2001

Related U.S. Application Data
(60) Provisional application No. 60/174,856, filed on Jan. 7, 2000.

(51) Int. Cl.[7] ............................................. A01K 61/02
(52) U.S. Cl. ...................................................... 119/57.9
(58) Field of Search ............................... 119/52.1, 52.2, 119/52.3, 52.4, 57.8, 57.9

(56) References Cited

U.S. PATENT DOCUMENTS

| | | | |
|---|---|---|---|
| 4,541,362 A | | 9/1985 | Dehls |
| 4,846,111 A | * | 7/1989 | Kilham ...................... 119/57.9 |
| 5,048,461 A | | 9/1991 | Wessner |
| 5,105,765 A | | 4/1992 | Loken |
| 5,163,382 A | * | 11/1992 | Morrison .................... 119/57.9 |
| 5,297,503 A | | 3/1994 | Hibbard |
| 5,392,732 A | | 2/1995 | Fry |
| 5,471,951 A | | 12/1995 | Collins |
| 5,690,056 A | | 11/1997 | Korb |
| 5,720,238 A | | 2/1998 | Drakos |
| 5,826,540 A | * | 10/1998 | Bridges ...................... 119/52.3 |
| 5,829,382 A | * | 11/1998 | Garrison .................... 119/52.2 |
| 5,964,183 A | * | 10/1999 | Czipri ....................... 119/52.3 |

* cited by examiner

Primary Examiner—Peter M. Poon
Assistant Examiner—Kevin Jakel
(74) Attorney, Agent, or Firm—Hinkle & O'Bradovich, LLC

(57) ABSTRACT

The present invention includes spring loaded elongated cylindrical perches incorporated into bird feeders, wherein the perches have typically a round perch member which, when loaded by an undesirable bird or other pest, will sense the weight of the pest and the weight will overcome the spring loaded perch and the perch will collapse at a fulcrum point thereby dislodging the bird or pest. The spring is designed to have the capability of elongating upon the application of a predetermined force being applied to the spring by means of the weight of the pest on the perch, and then the spring will elongate causing the perch to bend vertically downward with respect to the ground dislodging the pest, and when the longitudinal force on the spring is relaxed, the spring then resumes its relaxed length and draws the perch back into battery with respect to the spring housing assembly.

12 Claims, 7 Drawing Sheets

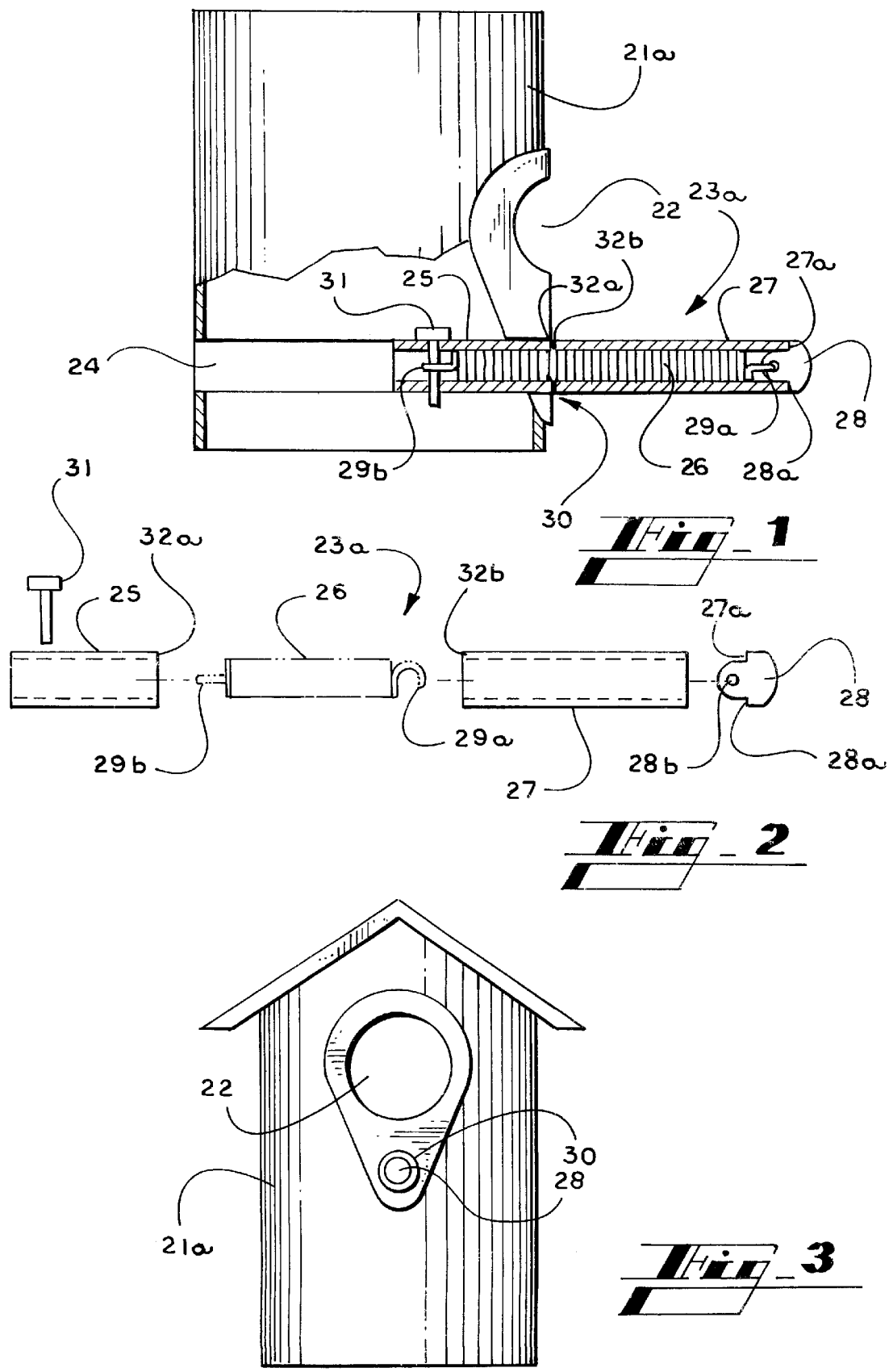

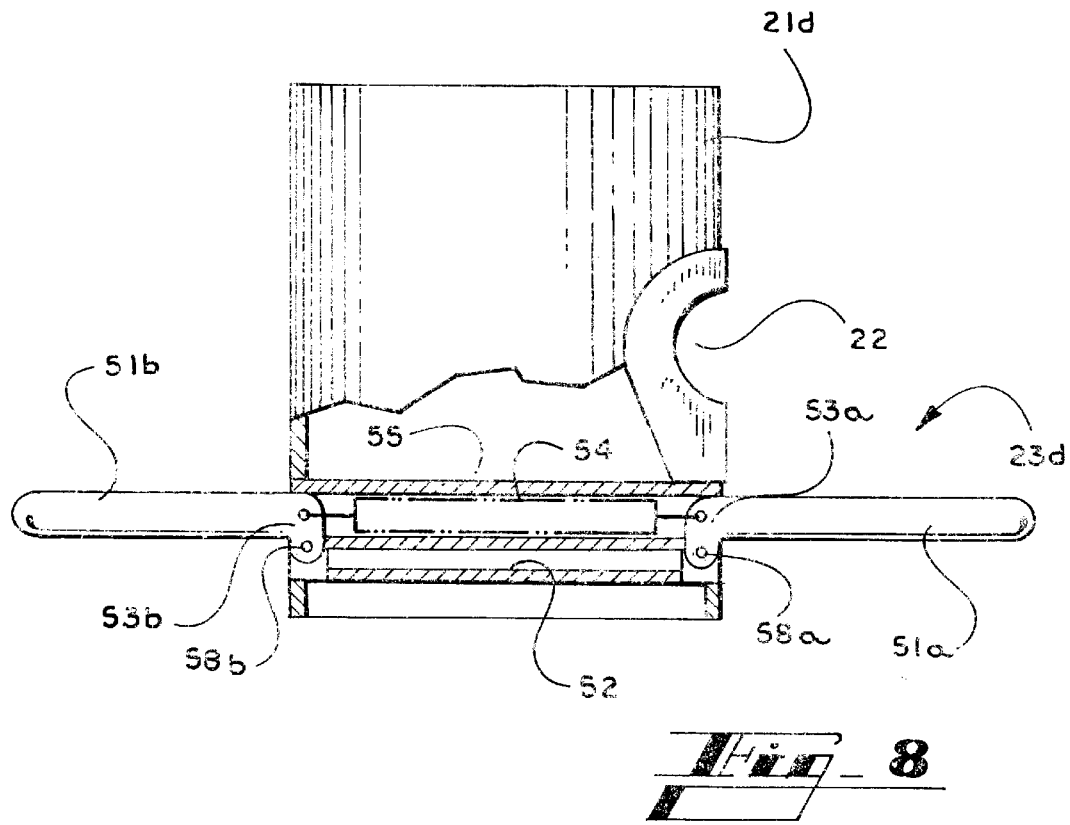
Fig_8
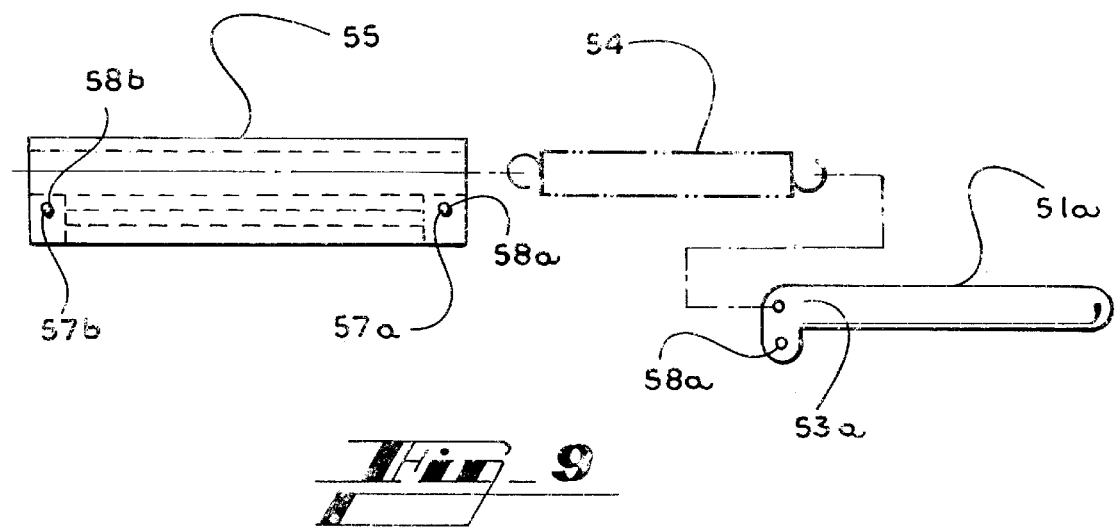
Fig_9

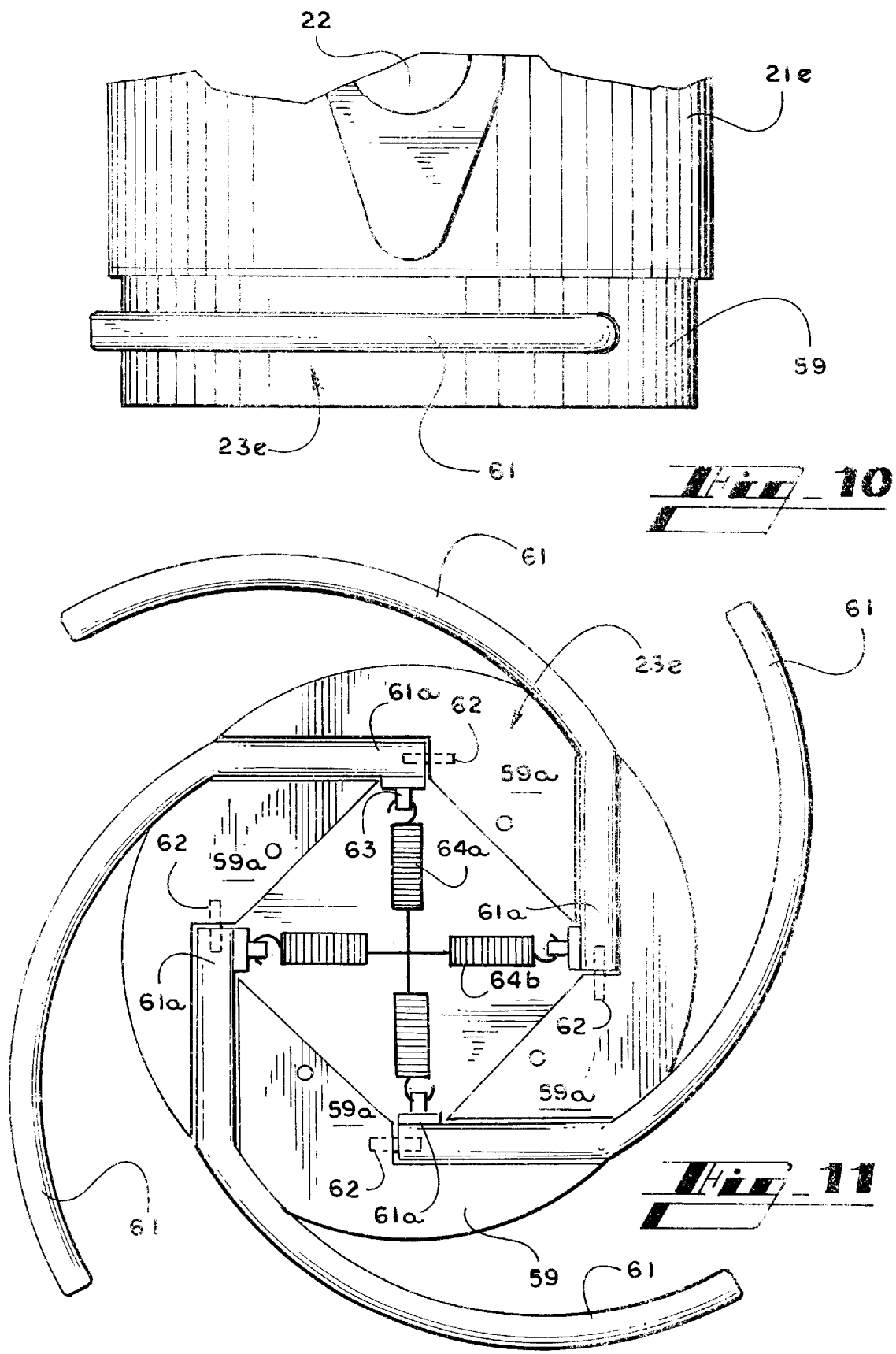

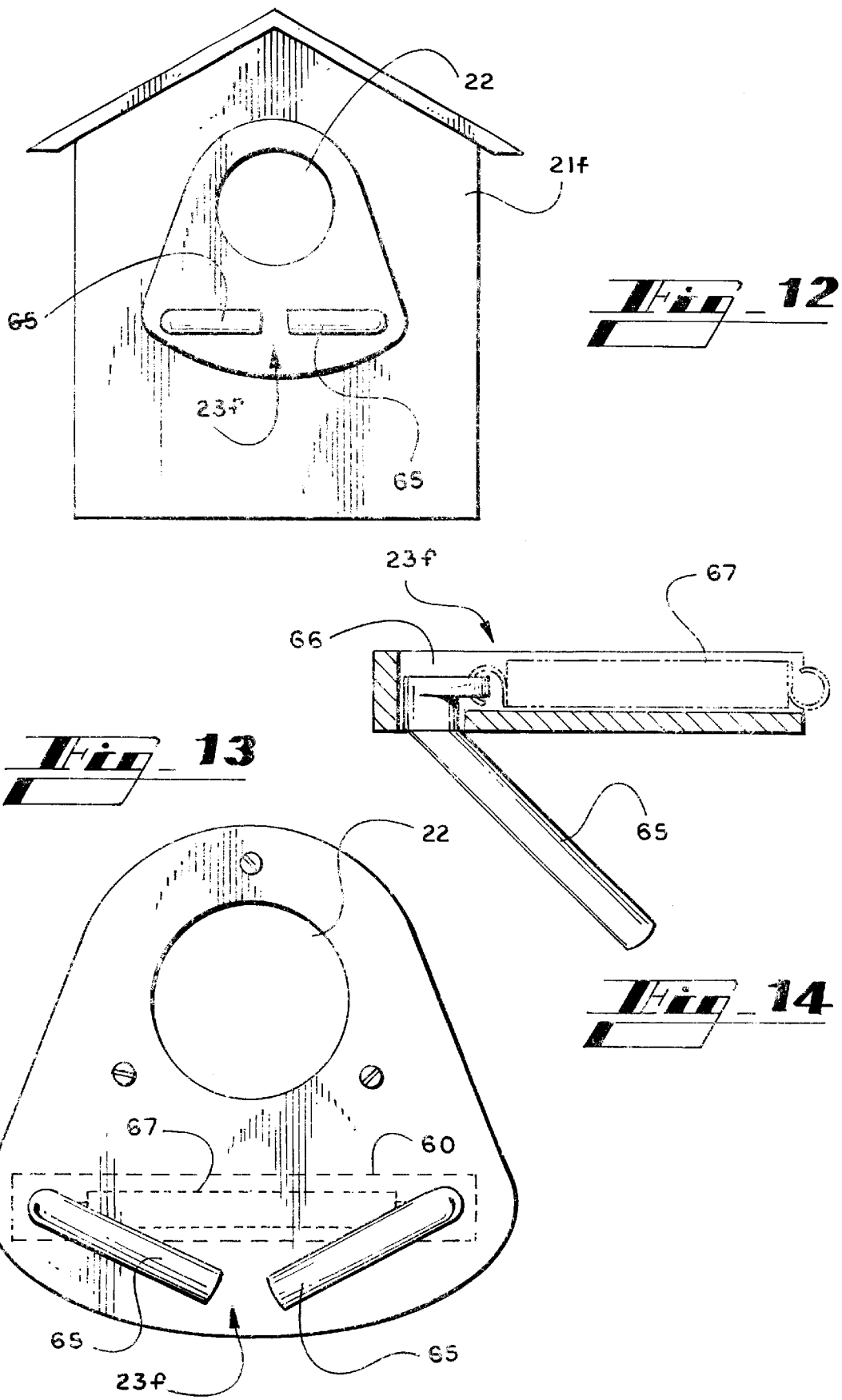

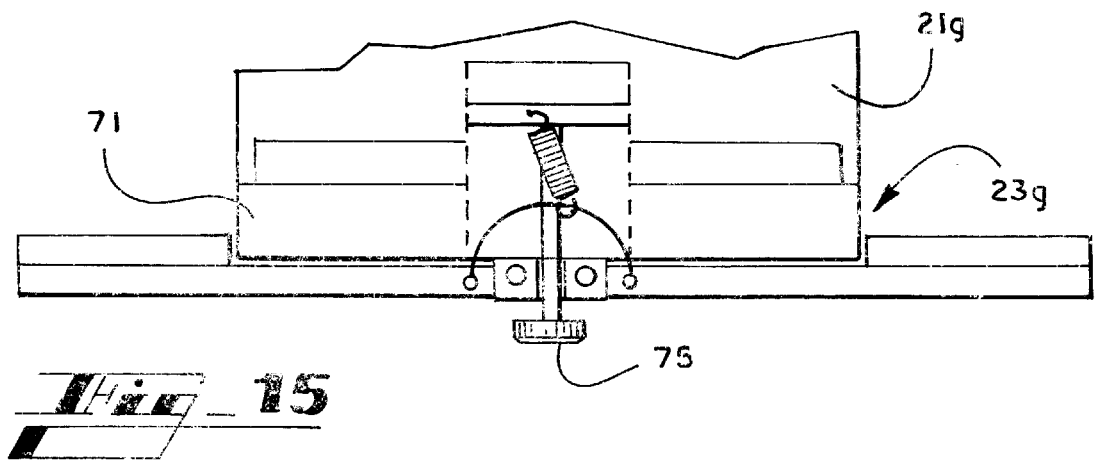
Fig_15
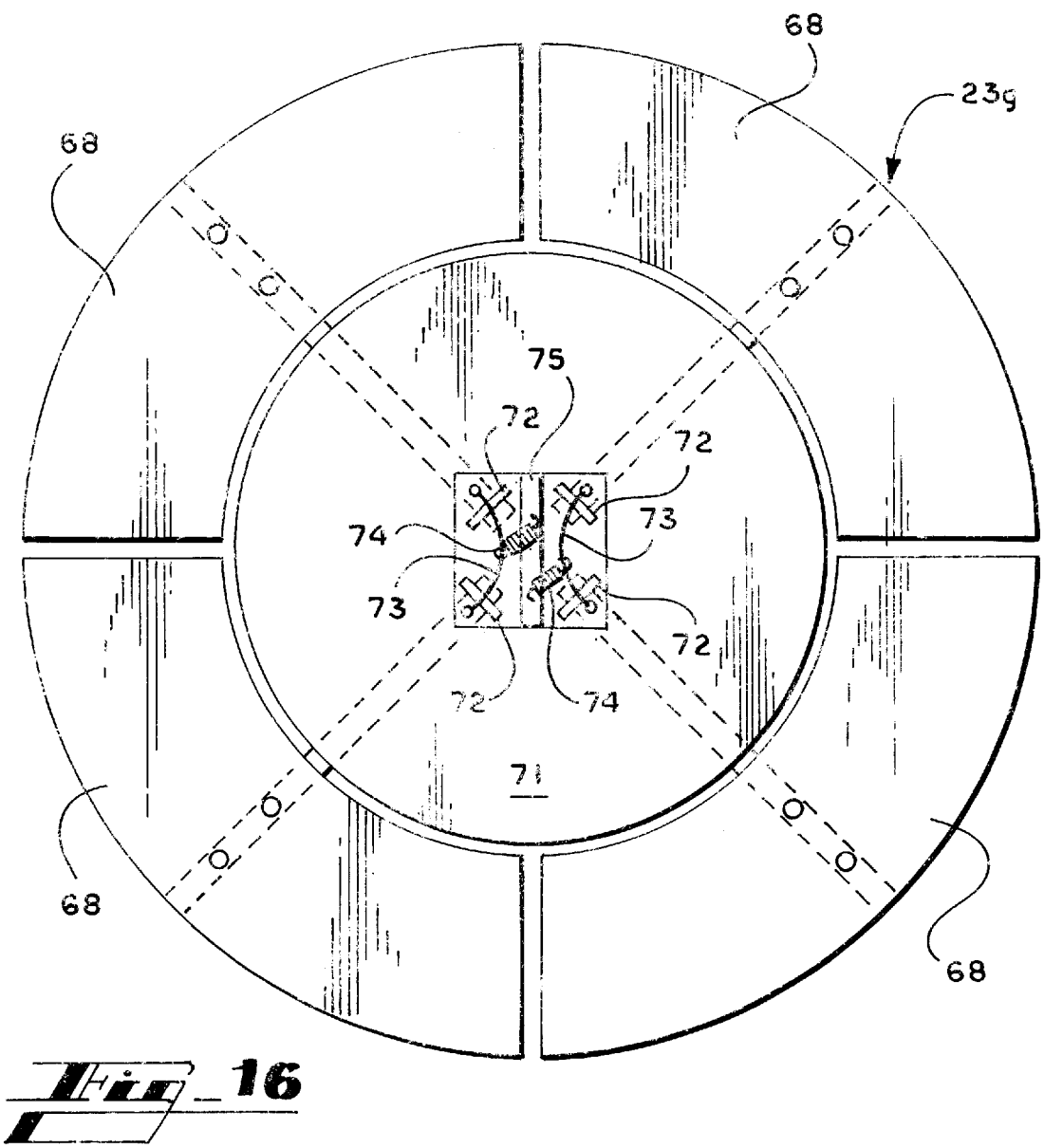
Fig_16

COLLAPSIBLE PERCHES FOR BIRD FEEDERS AND BIRDHOUSES

This application claims priority from Provisional application Ser. No. 60/174,856, filed on Jan. 7, 2000.

BACKGROUND OF THE INVENTION

I. Field of the Invention

The present invention relates generally to the field of song bird feeders and, more particularly, to bird feeders which prevent unwanted rodents and birds from feeding at the feeder. The feeder of the present invention also provides a great deal of amusement to those watching when an unwanted rodent alights on the feeder.

Bird watching is a fulfilling activity for many and provides an educational tool for children in that it increases environmental consciousness. Further, bird feeders assist certain species of birds to find foods and supplements to augment their diets, especially during periods of severe weather.

II. Description of the Related Art

Not only are there many bird feeders of unlimited designs, there are also bird feeders which have been designed to prevent unwanted birds and rodents from invading and eating from bird feeders which have been designed for the typical lightweight song bird.

The prior art has disclosed many devices to effect the discouragement or removal of unwanted pests at the song bird feeder. For instance, there are a great number of weight sensitive, tiltable perches on bird feeders for dislodging the unwanted pest such as shown in the patents to Loken (U.S. Pat. No. 5,105,765), Wessner (U.S. Pat. No. 5,048,461) and Dehls (U.S. Pat. No. 4,541,362).

There are many electrical type devices which will shock unwanted pests which alight on a song bird feeder, such as is shown in Fry (U.S. Pat. No. 5,392,732) and Collins (U.S. Pat. No. 5,471,951).

Many weight sensitive devices have been shown wherein the food openings in the bird feeder will close if a heavier rodent than the normal song bird sits on the perch near the food opening. The patent to Drakos (U.S. Pat. No. 5,720,238) is typical of this type of mechanism.

There are also devices which sense a rodent, such as a squirrel or heavy unwanted bird, which will, at a predetermined point in time, effectively remove the unwanted pest from the feeder. Typical of these prior devices, is the patent to Hibbard (U.S. Pat. No. 5,297,503) and Korb (U.S. Pat. No. 5,690,056).

It is to the type of feeders which utilize weight sensitive, tiltable perches to which the present invention pertains.

SUMMARY OF THE INVENTION

In accordance with the present invention and the contemplated problems which have existed and continue to exist in this field, the objectives of this invention include providing a pest proof song bird feeder. The feeder of the present invention is mechanical in nature and presents several embodiments of the basic design.

The present invention generally includes spring loaded elongated cylindrical perches incorporated into bird houses and/or bird feeders (the terms are used interchangeably herein), wherein the perches have a typically round perch member which, when loaded by an undesirable bird or other pest, will sense the weight of the pest and the weight will overcome the spring loaded perch and the perch will collapse at a fulcrum point thereby dislodging the bird or pest. It should be noted that, while round perches are convenient, they do not exclude other configurations from the scope of this invention.

The spring which is utilized with the perches is designed to have the capability of elongating upon the application of a predetermined force being applied to the spring by means of the weight of the pest on the perch, and then the spring will elongate causing the perch to bend vertically downward with respect to the ground dislodging the pest, and when the longitudinal force on the spring is relaxed, the spring then resumes its relaxed length and draws the perch back into battery with respect to the spring housing assembly.

Other objects, advantages and capabilities of the invention will become apparent from the foregoing description taken in conjunction with the accompanying drawings showing the preferred embodiments of the invention.

BRIEF DESCRIPTION OF THE DRAWINGS

FIG. 1 is a partial elevation view of a birdhouse, partially in section, showing a first embodiment with a spring loaded perch;

FIG. 2 is an exploded perspective view of the perch assembly;

FIG. 3 is a front elevation view of a birdhouse;

FIG. 8 is a partial elevation sectional view of a birdhouse having another embodiment of a spring loaded perch assembly;

FIG. 9 is an exploded perspective view of the perch assembly of FIG. 8;

FIG. 10 is a partial front elevation view of a birdhouse having another embodiment of a spring loaded perch assembly;

FIG. 11 is a horizontal sectional view taken along lines 11—11 of FIG. 10;

FIG. 12 is a vertical elevation view of a birdhouse incorporating another embodiment of a spring loaded perch system;

FIG. 13 is a partial elevation view partially in section of the spring loaded perch assembly of FIG. 12;

FIG. 14 is a partial horizontal sectional view of the perch assembly of FIG. 13;

FIG. 15 is a partial vertical sectional view of another embodiment of a spring loaded perch assembly; and FIG. 16 is a partial horizontal sectional view of the spring loaded perch system of FIG. 15.

DESCRIPTION OF THE PREFERRED EMBODIMENTS

Figure 4:
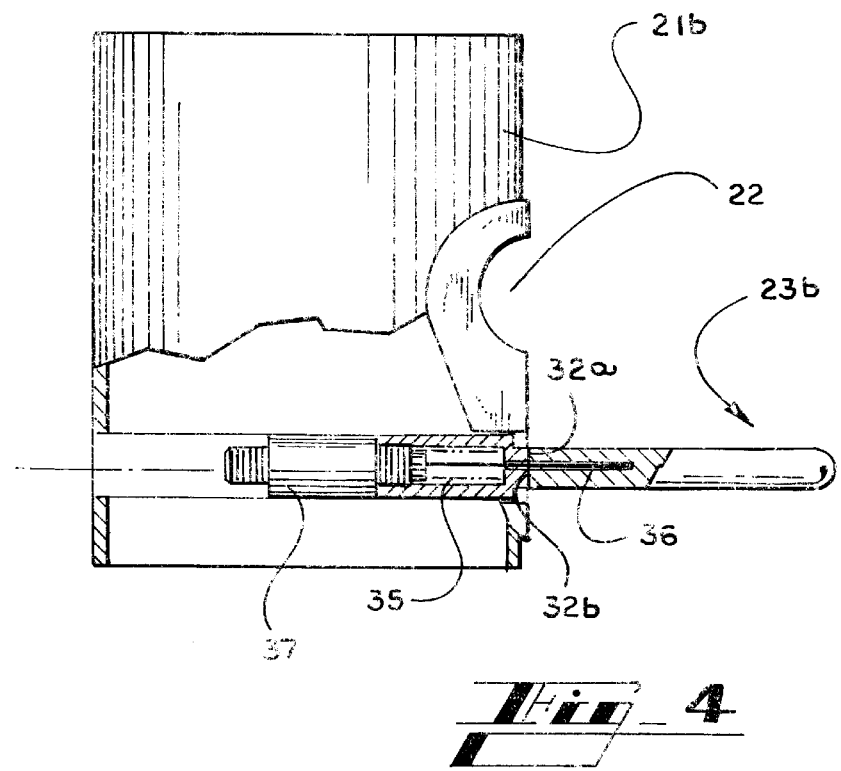
FIG. 4 is a partial section elevation view of a birdhouse showing a second embodiment partially in section of a perch assembly.

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIGS. 1, 2 and 3. The birdhouse 21 has an opening 22 in the vertical face thereof to allow access for the desired songbirds, and enclosed within the birdhouse 21 is a perch assembly 23 located within a suitable aperture 24. The perch assembly 23a comprises a spring housing 25, an extension spring 26, a perch sleeve 27 and a perch retainer 28 which is generally round to cover the open end of the sleeve 27. Shoulder 28a of the retainer 28 butts up against perch sleeve end 27a. The extension spring has a pair of opposed reentrant ends 29a and 29b. To maintain the perch assembly within the birdhouse 21, the spring housing is affixed to the birdhouse 21 by means of a suitable screw 31 which is secured to the birdhouse and thence secured to the spring housing 25. End 29b of the extension spring is also secured to the screw 31 and the extension spring 26 is then threaded through the perch sleeve 27 and end 29a is then secured to the perch retainer 28, through aperture 28b, which retainer is closely fitted to the perch sleeve. As is evident, the spring housing 25 and the perch sleeve 27 are of hollow cylindrical shape. Once the perch assembly 23a is fully assembled and placed within the aperture 24, the birdhouse 21 is ready for use. In operation, if a songbird of desired weight alights upon perch assembly 23a, the perch remains extended outwardly as shown in FIG. 1 allowing the songbird entrance and egress from the opening 22. However, if an undesirable bird or other pest alights upon the perch assembly 23a, the weight of the pest being greater than the elastic limit of the extension spring 26 will then cause the extension spring 26 to elongate and allow the perch sleeve 27 to collapse downwardly thereby dislodging the pest. The proximal contacting surface 32a of the spring housing and the proximal contacting surface 32b of the perch sleeve are in contact with one another forming a fulcrum when the spring is in the retracted relaxed condition, but when an overweight pest alights upon the perch sleeve 27 the perch sleeve will separate from the spring housing at fulcrum points 32a and 32b which will act as a fulcrum to permit the perch sleeve 27 to collapse downwardly.

Figure 5:
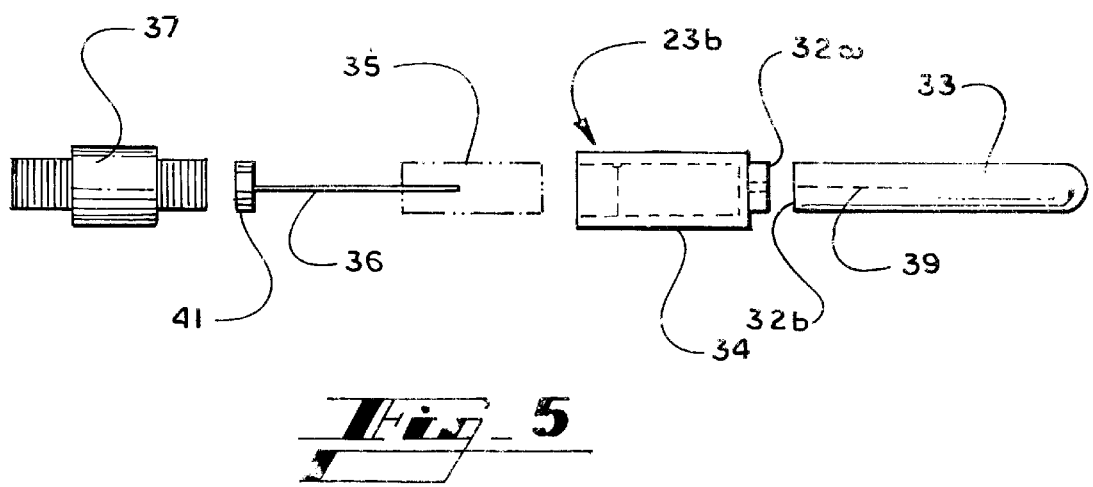
FIG. 5 is an exploded perspective view of the perch assembly of FIG. 4.

Referring now to FIGS. 4 and 5, another embodiment of the birdhouse and perch assembly is shown wherein the perch assembly 23b is placed in aperture 24 and generally comprises a generally cylindrical perch 33 wherein the contact point 32b abuts against the fulcrum contact point 32a of spring housing 34. Located within the hollow spring housing 34 is a compression spring 35 which terminates in a threaded coupler 37. Placed within the spring housing 34 is compression spring 35, and through the center of spring 35 is threaded a flexible cable 36 whose free end 38 is placed within an aperture 39 of perch 33 and then crimped tightly therein. The remote end 41 of flexible cable 36 then bears against compression spring 35. When an unwanted pest alights upon the perch 33, the perch will collapse downwardly dislodging the pest and, when such occurs, flexible cable 36 and its terminating end portion 41 will compress the compression spring 35 to allow the collapse of the perch 33. Once the unwanted pest is dislodged, the weight is obviously removed from the perch and compression spring will then expand to its normal relaxed condition pulling the perch 33 back into battery against spring housing 34.

Figure 6:
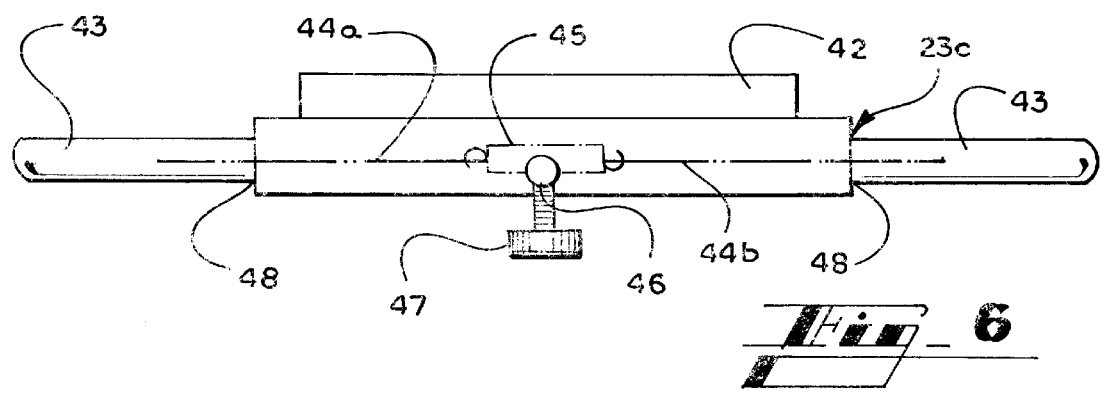
FIG. 6 is a partial sectional elevation view of another embodiment of a spring loaded perch assembly.
Figure 7:
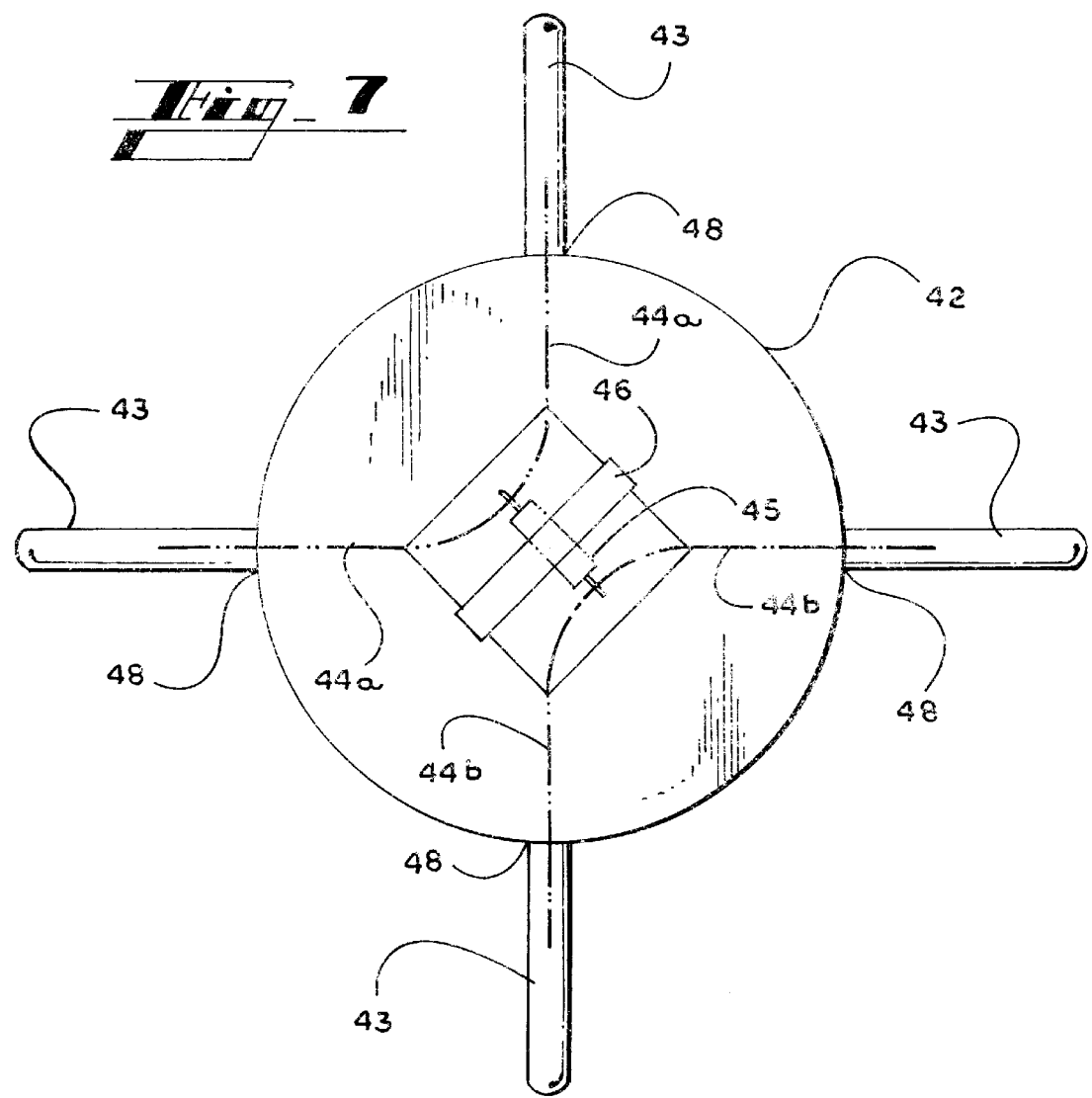
FIG. 7 is a bottom plan view of the perch assembly of FIG. 6.

Referring now to FIGS. 6 and 7, another embodiment of the perch assembly is identified as numeral 23c. In this embodiment the perch assembly comprises four (4) separate perches, all of which are designed to collapse downwardly upon the application of the weight of an unwanted pest. The perch assembly 23c includes a housing base 42 which encloses the perch assembly 23c and maintains the operable parts in the desired relationship. In this particular embodiment, housing base 42 encloses individual perches 43 wherein adjacent pairs of perches 43 are interconnected by respective flexible cables 44a and 44b. An extension spring 45 interconnects the midpoints of cables 44a and 44b, and the spring 45 is positioned against spring pre-load rod 46 which is adjustable vertically by a spring adjustment knob 47. As is seen in FIGS. 9 and 10, the spring 45 is positioned over the pre-load rod 46 so that upon application of adjustment either up or down of the spring adjustment knob 47, the tension of the spring may be varied to suit the desires of the user to pre-load the spring 45 to accept either a lesser or greater weight of bird alighting upon perches 43. The proximal ends 48 of the perches 43 will, upon the placement of excessive weight thereon above the desired threshold set into the spring 45, depress the perches vertically dislodging the pest. The perches in this particular embodiment will collapse about the fulcrum point at the juncture 48 of the perch with the base 42.

In the embodiment shown in FIGS. 8 and 9, which embodiment is similar to the embodiment of FIGS. 1 and 4, it is seen that there is a double perch assembly 23d comprising a pair of perches 51a and 51b which are mounted into aperture 52 within the birdhouse 21. Interconnecting the proximal distal pivot ends 53a and 53b of perches 51a and 51b, it is an extension spring 54 which is housed within spring housing 55. Spring housing 55 has respective opposing end contact points 56a and 56b which abut against proximal ends 53a and 53b of the respective perches. Maintaining the perches to the spring housing are pivot pins 57a and 57b which project through pivot pin apertures 58a and 58b of the spring housing, and ultimately through pivot apertures 58a and 58b of the perches. Again, with this particular embodiment, when an unwanted pest alights upon one or the other of the perches, the perch will collapse downwardly to extend the spring 54 to thereby dislodge the pest and once the pest has been dislodged then the extension spring returns to its normal relaxed length drawing the perches up to a horizontal condition.

Referring now to FIGS. 10 and 11, a birdhouse and feeder assembly 21e is shown wherein the lower base portion 59 houses the perch assembly 23e which show perches 61 projecting angularly from the base 59. The perches 61 have a curvilinear configuration and are attached to the base by means of pivot pins 62 which project from a mounting surface 59a within the base into the proximal ends 61a of the perches 61 in a rotatably sufficient manner so that when an unwanted pest alights upon any one of the perches 61, the perch will immediately collapse downwardly rotating about the pins 62 dislodging the pest. Each of the proximal ends of perches 61 have a spring mounting tab 63 into which an extension spring 64a or 64b, as the case may be, is positioned and fixed therein. Opposite perches are connected by the same spring, therefore, once one perch depresses the spring elongates and once the weight is removed from the perch the spring then rotates the perch back into battery. In this particular configuration, the perches are designed to allow birds to feed facing the feeder. In the configuration of a birdhouse, the perches allow adequate space for multiple baby birds to take off from the nest at the same time.

In FIGS. 12, 13 and 14, a modified version of the perch assembly of FIG. 10 is shown wherein the angularly mounted perches 61 have distal ends facing one another. The perch assembly 23f includes perches 65 which have proximal spring mounting ends 66 which are attached to respective ends of an extension spring 67, which extension spring will elongate when excessive weight is placed upon one or the other of the perches 65 allowing the perch to collapse and dislodge the pest, and once such is done the extension spring 67 will then return the perch to the normal horizontal position at the front of the birdhouse 21f. As seen in FIG. 13, spring 67 resides within aperture 60.

Referring now to FIGS. 15 and 16, a modified arrangement of the feeder and house system of FIGS. 6 and 7 is shown wherein the perch assembly 23g includes perches 68 which are flat horizontal planar surfaces that form an annular platform around the feeder 21g. Each quadrant of the platform tray 69 is attached to a control arm 69 which, in turn, is attached to the feeder base 71 by a pivot pin 72. A flexible cable 73 is attached at its respective ends to respective proximal ends to adjacent pairs of control arms and, at the midpoint thereof, there is an extension spring 74 which is attached between the adjustment rod 75 and the respective cable 73. This particular embodiment operates much in the same manner as previously described in that when an unwanted heavyweight pest alights upon platform 68, the platform depresses and the spring extends when a specific weight is applied thereto. The springs 74 are adjustable for perceived weight upon the platform 68 by means of the adjustment rod 75, which operates much in the same manner as the spring adjustment mechanism 47 shown in FIG. 6.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A bird feeder comprising:
    a housing having at least one wall, the wall having an outer surface,
    a collapsible perch member mounted to the housing,
    a spring connecting the perch member to the housing at a fulcrum to maintain the perch member in a predetermined position at the fulcrum, and
    the housing having an aperture in the wall, the perch member being positioned in the aperture.

2. A bird feeder as claimed in claim 1 having a spring housing positioned in the aperture, a perch sleeve having a proximal end and a distal end, the spring housing having a proximal end and a distal end, the proximal end of the spring housing and the proximal end of the perch sleeve being juxtaposed to form the fulcrum.

3. A bird feeder as claimed in claim 2 wherein the distal end of the spring housing is fixed in the aperture of the bird feeder housing, one end of the spring is fixed proximate to the distal end of the spring housing and the other end of the spring is fixed proximate to the distal end of the perch sleeve.

4. A bird feeder as claimed in claim 2 wherein a coupler having a proximal end and a distal end is fixedly placed within the aperture, the distal end of the spring housing being coupled to the coupler, the spring being retained in compression within the spring housing, a cable being attached to the perch sleeve and passing through the spring housing and terminating adjacent to the proximal end of the coupler.

5. A bird feeder as claimed in claim 1, wherein a plurality of perch members are positioned in the housing aperture, a spring housing positioned in the aperture, the perch members having a proximal end and a distal end, the spring housing having a pair of opposing ends wherein each end is juxtaposed to the proximal end of respective perch members, and wherein each of said perch member ends have a pivot pin aperture therein.

6. A bird feeder as claimed in claim 5 wherein the proximal end of each perch member having a pivot pin aperture aligned with the pivot pin aperture of the respective opposing end of the spring housing, a pivot pin positioned in each of the aligned apertures of the perch member and the spring housing, the spring being attached to each respective proximal end of the perch members.

7. A bird feeder as claimed in claim 1 wherein a pair of perch members are positioned in the aperture and each perch member has a proximal end, each proximal end being rotatably mounted within the aperture, the spring interconnecting the proximal ends of the perch members.

8. A bird feeder comprising:
    a housing having at least one wall, the wall having an outer surface,
    a collapsible perch member mounted to the housing,
    a spring connecting the perch member to the housing at a fulcrum to maintain the perch member in a predetermined position at the fulcrum, and
    the housing having a base portion, a plurality of pairs of adjacent perch members juxtaposed to the base portion, a flexible cable interconnecting a first pair of perch members, a flexible cable interconnecting a second pair of perch members, the spring interconnecting the cables and maintaining the perch members juxtaposed to the base portion.

9. A bird feeder as claimed in claim 8 further comprising an adjustable spring tensioning means juxtaposed to the spring.

10. A bird feeder as claimed in claim 8 wherein each cable has a spring to interconnect the respective cable to an adjustable spring tensioning means.

11. A bird feeder comprising:
    a housing having at least one wall, the wall having an outer surface,
    a collapsible perch member mounted to the housing,
    a spring connecting the perch member to the housing at a fulcrum to maintain the perch member in a predetermined position at the fulcrum, and
    the housing having a base portion, a plurality of opposed pairs of perch members positioned adjacent to the base portion, each opposed pair of perch members having a proximal end and a distal end with a spring interconnecting the respective proximal ends, each of the proximal ends being rotatably mounted at the fulcrum to the base portion.

12. A bird feeder as claimed in claim 11 wherein each of the perch members have a curvilinear configuration.

* * * * *